(12) United States Patent
Addleman et al.

(10) Patent No.: US 7,634,590 B2
(45) Date of Patent: Dec. 15, 2009

(54) RESOURCE POOL MONITOR

(75) Inventors: Mark J. Addleman, San Francisco, CA (US); John Bley, San Mateo, CA (US); Brian Zuzga, San Francisco, CA (US)

(73) Assignee: Computer Associates Think, Inc., Islandia, NY (US)

( * ) Notice: Subject to any disclaimer, the term of this patent is extended or adjusted under 35 U.S.C. 154(b) by 342 days.

(21) Appl. No.: 11/268,912

(22) Filed: Nov. 8, 2005

(65) Prior Publication Data

US 2007/0083648 A1  Apr. 12, 2007

Related U.S. Application Data

(60) Provisional application No. 60/725,729, filed on Oct. 12, 2005.

(51) Int. Cl.
*G06F 3/00* (2006.01)
*G06F 7/00* (2006.01)

(52) U.S. Cl. ......................... 710/15; 707/101
(58) Field of Classification Search ................. 709/224, 709/226, 225; 738/715; 710/72, 15; 707/101
See application file for complete search history.

(56) References Cited

U.S. PATENT DOCUMENTS

| | | | |
|---|---|---|---|
| 4,959,767 A * | 9/1990 | Buchner et al. ............... 700/31 |
| 5,655,081 A | 8/1997 | Bonnell et al. |
| 5,898,873 A | 4/1999 | Lehr |
| 5,978,594 A | 11/1999 | Bonnell et al. |
| 6,332,212 B1 | 12/2001 | Organ et al. |
| 6,771,595 B1 * | 8/2004 | Gilbert et al. ............... 370/229 |
| 2003/0018762 A1 * | 1/2003 | Mullen ....................... 709/223 |
| 2006/0047815 A1 * | 3/2006 | Hamadi ...................... 709/226 |
| 2006/0173877 A1 * | 8/2006 | Findeisen et al. ........... 707/101 |
| 2007/0053005 A1 * | 3/2007 | Cowburn .................... 358/3.28 |

OTHER PUBLICATIONS

Gotwals, Linear Least Squares Alogrithm Explanation, 1998, The Shodor Education Foundation, Inc.*

* cited by examiner

*Primary Examiner*—Henry W. H. Tsai
*Assistant Examiner*—Hyun Nam
(74) *Attorney, Agent, or Firm*—Vierra Magen Marcus & DeNiro LLP

(57) ABSTRACT

Resource pool depletion information, including the estimated time until the resource pool is depleted, is derived from resource pool data. Data regarding the size of a resource pool is collected over a period of time. The data may include the resource pool size and other information. One or more functions are then generated to fit one or more sets of data within the collected resource pool data. The best fitting function is selected from the generated functions and used to determine the time at which the particular resource pool will become depleted. Values for the selected function can be generated at future points in time to determine the depletion point of the resource pool. The time information as well as depletion confidence values are provided to a user or otherwise processed.

27 Claims, 12 Drawing Sheets

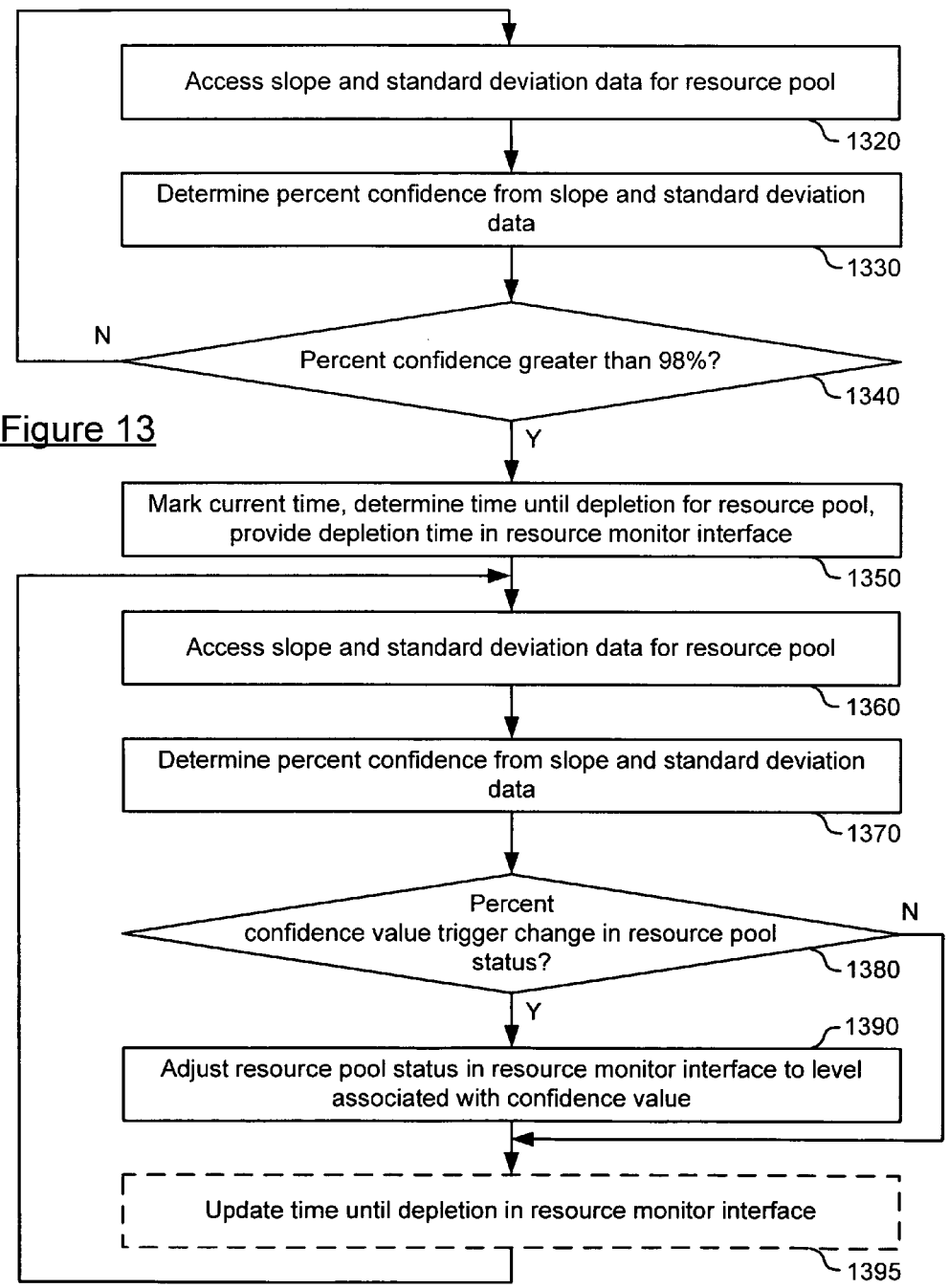

RESOURCE POOL MONITOR

This application claims the benefit of U.S. Provisional Application No. 60/725,729, filed on Oct. 12, 2005, entitled "Resource Pool Monitor," having inventors Mark J. Addleman, John Bley, and Brian Zuzga.

DESCRIPTION OF THE RELATED ART

Network based systems, such as systems providing a web service over the Internet, are often implemented using application servers. Application servers typically have one or more applications. Each application can usually perform some service, such as update a database, provide a web page, or some other service.

Applications often use resources to perform these services. A resource can be an element used by an application of which there is a limited supply of. Examples of resources include threads, memory, and databases. One or more resources are often maintained in resource pools. Each resource in a pool performs a particular task. In many cases, a resource pool will handle a number of resources that perform the same task. For example, a resource pool may contain a number of thread resources to carry out work processes.

The number of resources in a resource pool varies over time. A resource pool is initialized with a number of resources. As applications request resources, a resource within the pool is provided to the requesting application. In some cases, an application which has requested a resource does not properly return the requested resource. When a resource is not returned to the resource pool by the application, the resource becomes unavailable. As resources become unavailable over time, resource pools become depleted.

Information regarding use of resources within a resource pool is valuable in managing a system which utilizes multiple resources. Previously, systems have provided information regarding the number of resources currently available in a resource pool. Thus, an administrator having access to the system could be informed of the current or recent size of the resource pool. However, more information about resource pools would be valuable to administrators and/or users.

SUMMARY

The technology herein, roughly described, pertains to providing information regarding the estimated depletion of a resource pool. Data associated with the size of a resource pool is collected over a period of time. The data may include the resource pool size and other information. A function is then generated that best fits or approximates the collected data. In one embodiment, several functions are generated and applied to the data. A best fit function is then selected from the several generated functions. The best fit function is used to determine the time at which the particular resource pool may become depleted. In one embodiment, values for the selected function are generated at future points in time to determine the depletion point of the resource pool. This depletion information is then provided to a user, administrator, or otherwise processed.

In one embodiment, the resource pool data is retrieved using code that was added via byte code instrumentation. In this case, code is inserted into the object code of an application. The inserted code retrieves data from the resource pool and provides the data for processing. In some embodiments, other technologies, including as Java Management Extensions (JMX) and Performance Monitoring Infrastructure (PMI), can be used to obtain data from a resource pool.

This summary is provided to introduce a selection of concepts in a simplified form that are further described below in the description. This summary is not intended to identify key features or essential features of the claimed subject matter, nor is it intended to be used as an aid in determining the scope of the claimed subject matter.

BRIEF DESCRIPTION OF THE DRAWINGS

FIG. 13 illustrates an embodiment of a method for providing resource pool depletion information.

DETAILED DESCRIPTION

Depletion information for one or more resource pools is estimated and provided to an administrator and/or user. In one embodiment, the depletion information may include the time until pool depletion and the likelihood or confidence level that the pool is currently headed towards depletion. Depletion information is derived from pool resource data. Resource pool data includes the resource pool size and other data, and is collected over a period of time.

Resource pool data is processed to determine resource pool information. In one embodiment, a function is generated that best fits or approximates the collected resource pool data. In some cases, several functions can be generated and applied to one or more sets of resource pool data associated with a resource pool. A best fit function is then selected from the several generated functions. After the best fit function is selected, the function is used to determine resource depletion information. In one embodiment, one or more values for the selected function are generated for future points in time to determine the time of depletion for the resource pool. This is discussed in more detail below.

Depletion information may be determined for resource pools having different types of resources. In one embodiment, a resource may be anything used by an application of which there is a limited supply. Examples of resources include, but are not limited to, threads, connections, memory and cache. Examples of thread resources include execution threads, asynchronous threads, EJB threads and servlet threads. Examples of connection resources include database connections and backend connections.

In one embodiment, the resource pool data is retrieved by code that was inserted into an application using byte code instrumentation. The inserted code retrieves data from the resource pool and provides the data for processing. In some embodiments, other technologies, including as Java Management Extensions (JMX) and Performance Monitoring Infrastructure (PMI), can be used to obtain data from a resource pool. Accessing resource pool data using each of these technologies is discussed in more detail below.

Figure 1:
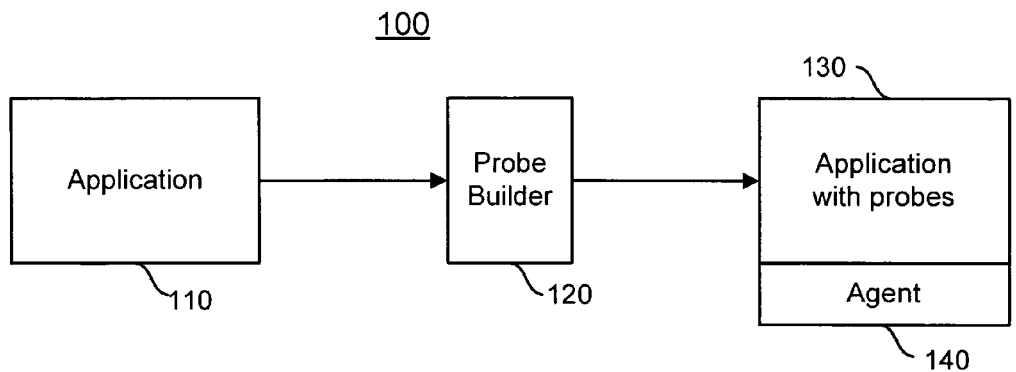
FIG. 1 illustrates an embodiment of a block diagram describing how byte code for an application is implemented.

FIG. 1 depicts an exemplar process for modifying an application's bytecode. FIG. 1 includes application 110, probe builder 120, application with probes 130, and agent 140. Probe Builder 120 instruments (e.g. modifies) the bytecode for Application 110 to add probes and additional code to Application 110 in order to create Application 130. Once the probes have been installed in the application bytecode, the application is referred to as a managed application. The probes may measure specific pieces of information about the application without changing the application's business logic. In particular, the probes may measure the number of resources added to and removed from a resource pool.

Probe Builder 120 also adds Agent 140 to application 130. Agent 140 may be installed on the same machine as Application 130 or a separate machine. Agent 140 may receive information from the probes of application 130 and/or access resource pool data directly from a resource pool. More information about instrumenting byte code can be found in U.S. Pat. No. 6,260,187 "System For Modifying Object Oriented Code" by Lewis K. Cirne, and U.S. patent application Ser. No. 09/795,901, "Adding Functionality To Existing Code At Exits," filed on Feb. 28, 2001, both of which are incorporated herein by reference in its entirety.

Figure 2:
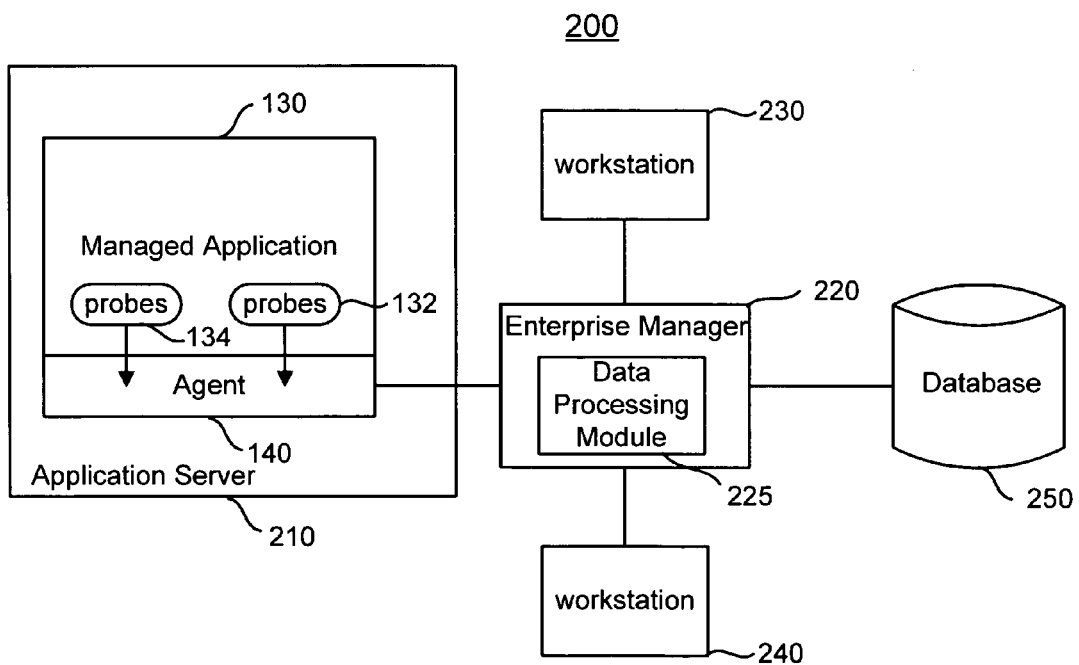
FIG. 2 illustrates an embodiment of a system for monitoring resource pools.

FIG. 2 illustrates an embodiment of a system 200 for monitoring resource pools. System 200 includes application server 210, enterprise manager 220, work station 230, work station 240, and database 250. Application server 210 includes managed application 130 (application with probes) and agent 140. Managed application 130 includes probes 134 and 132. Enterprise manager 220 includes data processing module 225.

In one embodiment, Application server 210 is a running system which may have multiple applications. Each application may include a managed application component as well as one or more agents. Although application server 210 is illustrated with one managed application and one agent, an application server may contain more than one application and agent module. Application server 210 is discussed in more detail with respect to FIG. 3.

Probes 132 and 134 of FIG. 2 access data from managed application 130. The probes provide the accessed data to agent 140. The data may include data indicating the actual number of resources in a resource pool or data from which the number of resources can be derived. For example, the data may include a number of add resource and remove resource commands. In this case, the code implementing the probes may determine the number of resources by comparing the number of resources added and dropped for the pool. The determined number of resources may then be transmitted to agent 140. In some embodiments, the add resource and remove resource commands themselves are transmitted to Agent 140. Agent 140 then determines the number of resources in the resource pool from the accessed commands received from the probes.

Enterprise Manager 220 receives performance data from managed applications via Agent 140, runs requested calculations, makes performance data available to workstations (e.g. 230 and 126) and optionally sends depletion data to database 250 for later analysis. Enterprise Manager 220 includes Data Processing Module 225. Data Processing Module 225 may receive, process and transmit data. In one embodiment, Data Processing Module 225 may determine resource pool depletion information from resource pool data received from Agent 140.

Workstations 230 and 240 may include one or more graphical user interfaces for viewing performance data. The workstations are used to create custom views of depletion data which can be monitored by a human operator. In one embodiment, the workstations consist of two main windows: a console and an explorer. The console displays performance data in a set of customizable views. The explorer depicts alerts and calculators that filter depletion data so that the data can be viewed in a meaningful way. The elements of the workstation that organize, manipulate, filter and display depletion data include actions, alerts, calculators, dashboards, persistent collections, metric groupings, comparisons, smart triggers and SNMP collections.

In one embodiment of system 200 of FIG. 2, each of the components is running on different machines. That is, workstation 240 is on a first computing device, workstation 230 is on a second computing device, Enterprise Manager 220 is on a third computing device, and managed Application 130 is running on a fourth computing device. In another embodiment, two or more (or all) of the components are operating on the same computing device. For example, managed application 130 and Agent 140 may be on a first computing device, Enterprise Manager 220 on a second computing device and a workstation on a third computing device. Alternatively, all of the components of FIG. 2 can run on the same computing device. Any or all of these computing devices can be any of various different types of computing devices, including personal computers, minicomputers, mainframes, servers, handheld computing devices, mobile computing devices, etc. Typically, these computing devices will include one or more processors in communication with one or more processor readable storage devices, communication interfaces, peripheral devices, etc. Examples of the storage devices include RAM, ROM, hard disk drives, floppy disk drives, CD ROMS, DVDs, flash memory, etc. Examples of peripherals include printers, monitors, keyboards, pointing devices, etc. Examples of communication interfaces include network cards, modems, wireless transmitters/receivers, etc. The system running the managed application can include a web server/application server. The system running the managed application may also be part of a network, including a LAN, a WAN, the Internet, etc. In some embodiments, all or part of the invention is implemented in software that is stored on one or more processor readable storage devices and is used to program one or more processors to perform the methods described herein.

Figure 3:
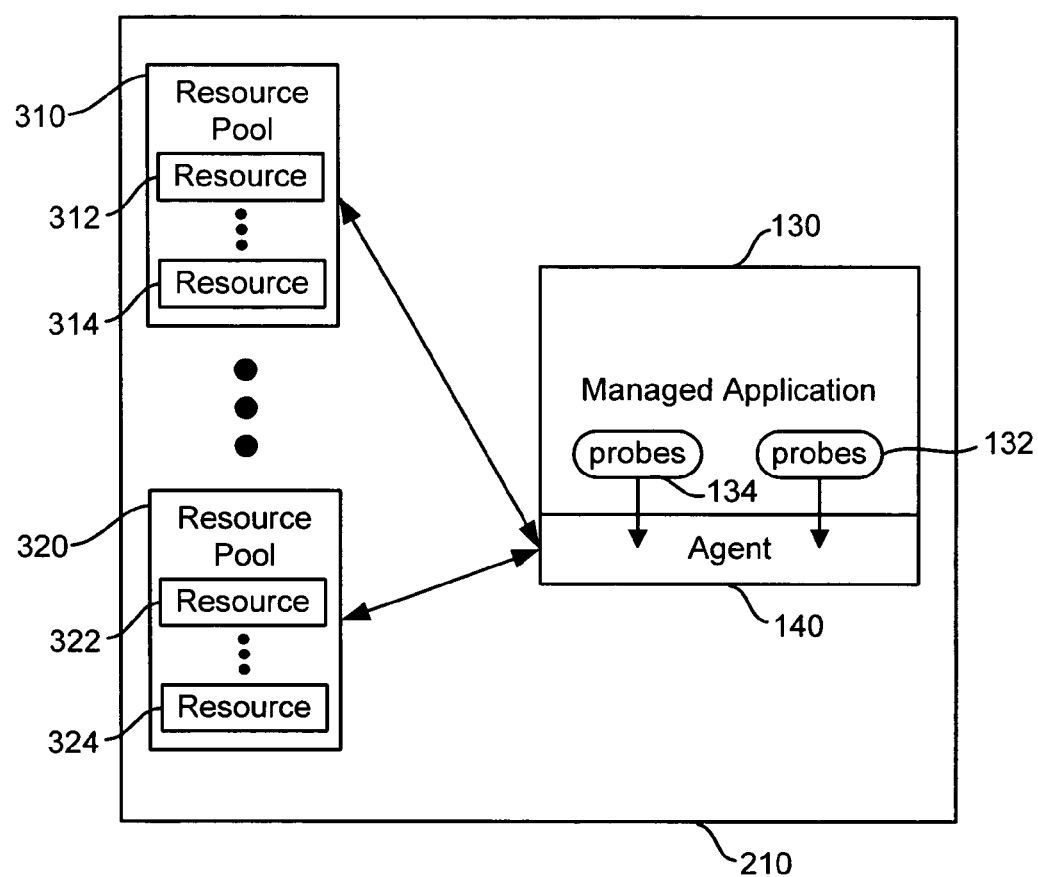
FIG. 3 illustrates an embodiment of an application server having resource pools.

FIG. 3 illustrates an embodiment of an application server 210 having resource pools. In one embodiment, FIG. 3 provides more detail of application server 210 of FIG. 2. Application server 210 includes resource pool 310, resource pool 320, managed application 130, and agent 140. Managed application 130 and agent 140 of system 300 are the same as those discussed above with reference to system 200 of FIG. 2.

Agent 140 may receive data from resource pool 310, resource pool 320, and managed application 130. For example, Agent 140 may access resource pool data from resource pools 310 and 320. After collecting or accessing the data, Agent 140 may summarize the data and transmit the data to Enterprise Manager 120.

Resource pool 310 includes resource 312 and resource 314. Resource pool 320 includes resources 322 and resource 324.

Though only two resource pools are illustrated within application server 210, additional resource pools may be implemented. Additionally, although each of resource pools 310-320 are depicted to include only 2 resources, any number of resources may be contained within a resource pool.

Figure 4:
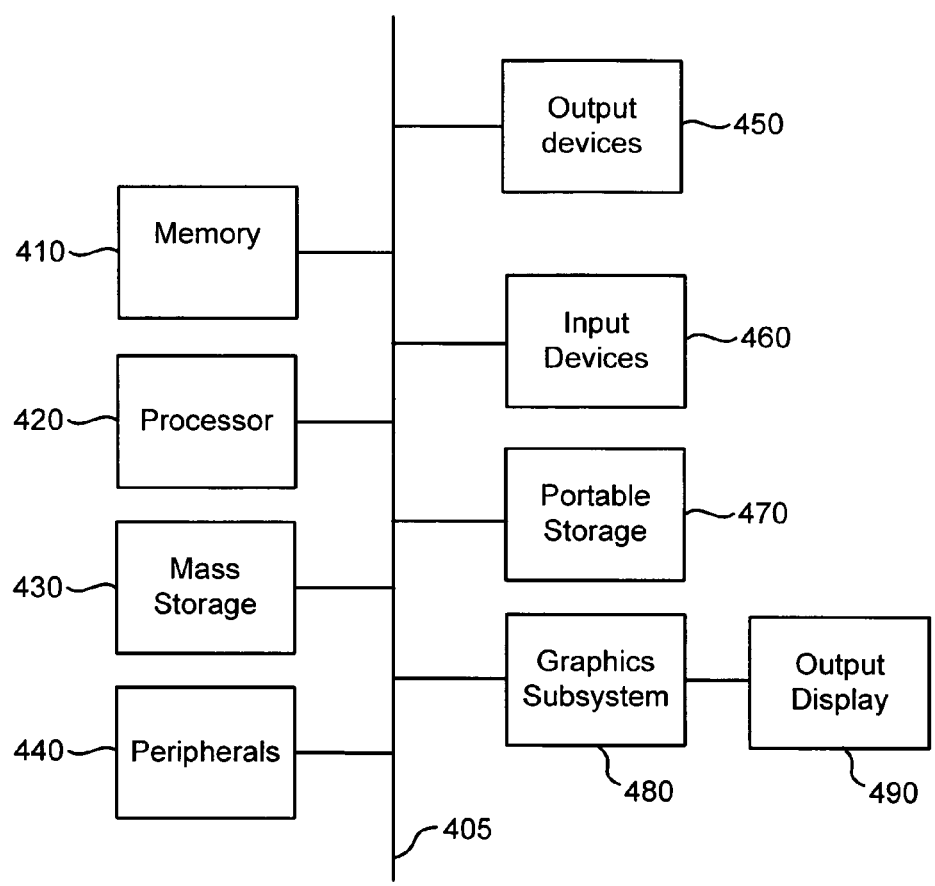
FIG. 4 illustrates an embodiment of a computing system.

FIG. 4 illustrates an embodiment of a computing system. In one embodiment, the system of FIG. 4 may be used to implement application server 210, enterprise manager 220, workstations 230-240, and database 250 of FIG. 2. The computer system of FIG. 4 includes one or more processors 420 and main memory 410. Main memory 410 stores, in part, instructions and data for execution by processor unit 420. If the system of the present technology is wholly or partially implemented in software, main memory 410 can store the executable code when in operation. The system of FIG. 4 further includes a mass storage device 430, peripheral device(s) 440, user input device(s) 460, output devices 450, portable storage medium drive(s) 470, a graphics subsystem 480 and an output display 490. For purposes of simplicity, the components shown in FIG. 4 are depicted as being connected via a single bus 405. However, the components may be connected through one or more data transport means. For example, processor unit 420 and main memory 410 may be connected via a local microprocessor bus, and the mass storage device 430, peripheral device(s) 440, portable storage medium drive (s) 470, and graphics subsystem 480 may be connected via one or more input/output (I/O) buses. Mass storage device 430, which may be implemented with a magnetic disk drive or an optical disk drive, is a non-volatile storage device for storing data and instructions for use by processor unit 420. In one embodiment, mass storage device 430 stores the system software for implementing the present invention for purposes of loading to main memory 410.

Portable storage medium drive 470 operates in conjunction with a portable non-volatile storage medium, such as a floppy disk, to input and output data and code to and from the computer system of FIG. 4. In one embodiment, the system software for implementing the present invention is stored on such a portable medium, and is input to the computer system via the portable storage medium drive 470. Peripheral device (s) 440 may include any type of computer support device, such as an input/output (I/O) interface, to add additional functionality to the computer system. For example, peripheral device(s) 440 may include a network interface for connecting the computer system to a network, a modem, a router, etc.

User input device(s) 460 provides a portion of a user interface. User input device(s) 460 may include an alpha-numeric keypad for inputting alpha-numeric and other information, or a pointing device, such as a mouse, a trackball, stylus, or cursor direction keys. In order to display textual and graphical information, the computer system of FIG. 4 includes graphics subsystem 480 and output display 490. Output display 490 may include a cathode ray tube (CRT) display, liquid crystal display (LCD) or other suitable display device. Graphics subsystem 480 receives textual and graphical information, and processes the information for output to display 490. Additionally, the system of FIG. 4 includes output devices 450. Examples of suitable output devices include speakers, printers, network interfaces, monitors, etc.

The components contained in the computer system of FIG. 4 are those typically found in computer systems suitable for use with the present invention, and are intended to represent a broad category of such computer components that are well known in the art. Thus, the computer system of FIG. 4 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

Figure 5:
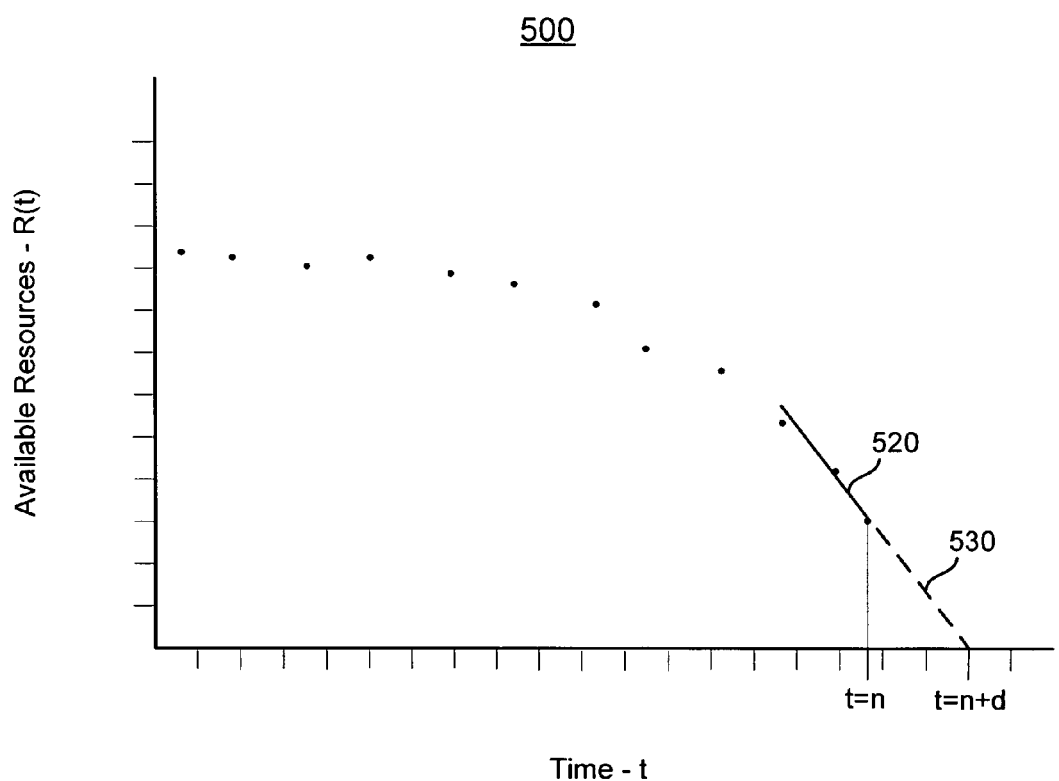
FIG. 5 illustrates a graph of resource depletion data.

FIG. 5 illustrates a graph 500 of resource pool data plotted on a two coordinate system. Graph 500 shows plots of a number of available resources R(t) in a resource pool over time t. Thus, each data point plotted in graph 500 corresponds to the size of a resource pool at a particular point in time. At initiation of the resource pool at the time corresponding to t=0, the number of resources is at a maximum. As time progresses (the value of t increases), the number of resources R(t) decreases. The most recent data point corresponds to a time value of t=n.

In one embodiment, a function is applied to all or a portion of the data associated with a resource pool. Values for the function are then generated for future time values to estimate when the resource pool will become depleted. The function can be a linear function or other type of function. In one embodiment, a linear function may comprise a line described by the formula y=mx+b. In this case, m is the slope of the line and b is y-intercept of the line.

For example, a line 520 corresponding to a linear function is fit to the last three data points plotted on graph 500. Linear regression is used to fit the line to the data points. Values for R(t) for time values beyond the current time t=n are then generated, as indicated by dashed line 530. Thus, even though the resource pool data is only provided up to a current time t=n, the linear function corresponding to dashed line 530 provides an estimated resource pool size for times up to the time t=n+d. At this point in time, the resource pool reaches the depletion point (here, the depletion point corresponds to the x axis, or R(t)=0) once the available resources for the particular resource pool become zero.

In one embodiment, different functions can be used to determine resource depletion. In the embodiment illustrated in FIG. 5, fitting a function to the resource pool data included fitting a linear function to data points using linear regression. In other embodiments, other types of functions may be used and fitted to a set of data. For example, a non-linear function may be fit to the data. Additionally, more than one function can be fit to the data, using different sets of data points or utilizing different functions.

Figure 6:
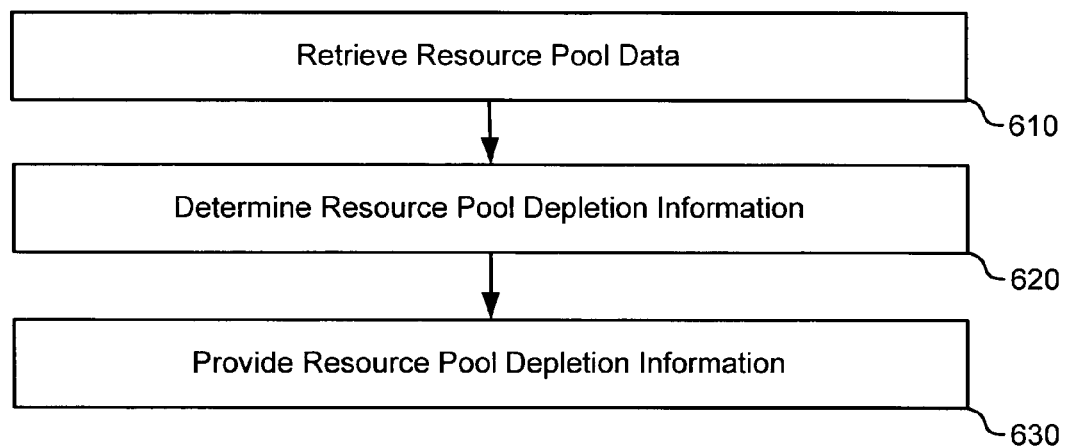
FIG. 6 illustrates an embodiment of a method for providing depletion information for a resource pool.

FIG. 6 illustrates an embodiment of a method 600 for providing depletion information for a resource pool. For purposes of discussion, a resource pool containing threads is discussed and assumed as the relevant resource pool unless otherwise specified. Method 600 begins with retrieving resource pool data at step 610. In one embodiment, data processing module 225 of FIG. 2 retrieves the resource pool data from agent 140. As discussed above, Agent 140 may receive resource pool data from a resource pool directly or through probes installed in an application. Retrieving resource pool data is discussed below in more detail with respect to method 700 of FIG. 7 and method 1200 of FIG. 12. Next, resource pool depletion information is determined at step 620. In one embodiment, the resource pool depletion information is derived from the resource pool data. The resource pool depletion information may include the time associated with resource pool depletion, a confidence level associated with the depletion of the resource pool, and other information. The resource pool depletion information can be determined by data processing module 225 of system 200. Step 620 is discussed in more detail below with respect to method 800 of FIG. 8. After the depletion information is determined, the resource pool depletion information is provided at step 630. In one embodiment, the depletion information is provided to a user or admin through a user interface. This is discussed in more detail below with respect to method 1300 of FIG. 13.

Figure 7:
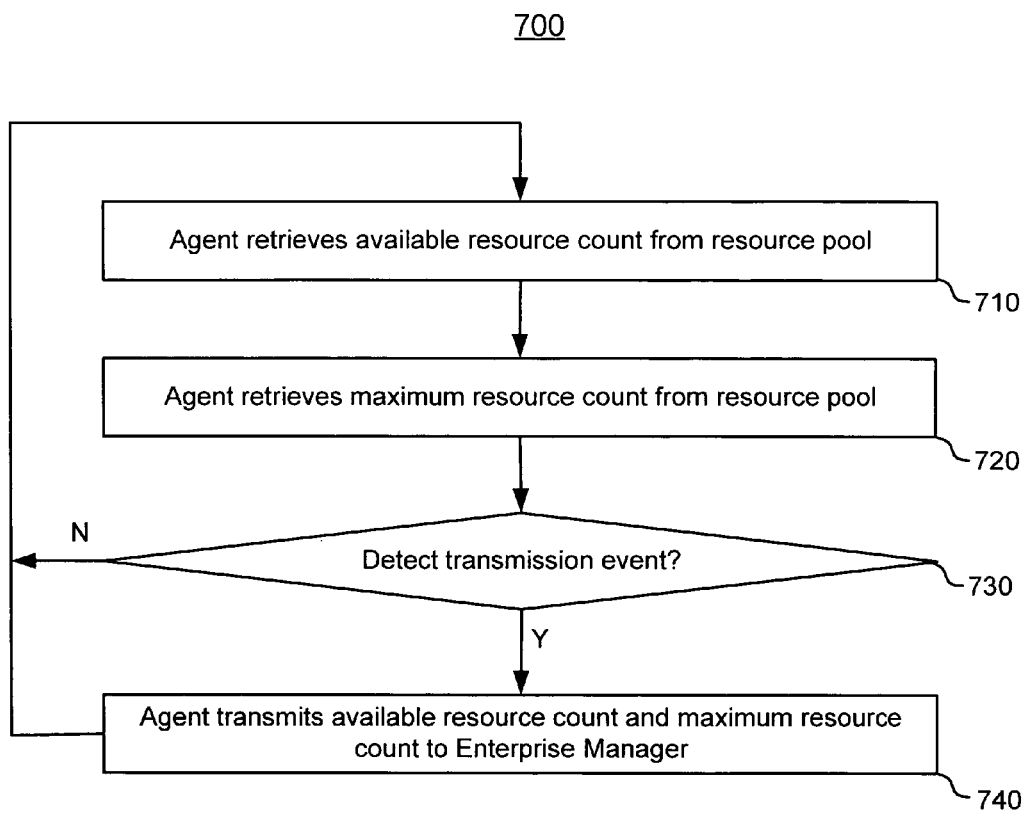
FIG. 7 illustrates an embodiment of a method for retrieving pool resource data.

FIG. 7 illustrates an embodiment of a method 700 for retrieving resource pool data. In one embodiment, method 700 provides more detail of step 610 of method 600 discussed above. Method 700 may be performed for each resource pool within an application server.

First, agent 140 receives the available resource count from a resource pool at step 710. The resource count is a value representing the quantity of available resources within a resource pool. Examples of systems used to retrieve resource data may include bytecode instrumentation, JMX, PMI, or some other system.

As discussed above, byte code instrumentation may be implemented in an application server-based system. Byte code instrumentation may be implemented on a custom application in an application server. As resources are added and removed from a resource pool over time, the probes may intercept and count the number of Add Resource calls and the number of Remove Resource calls made to a particular resource pool. The difference between these calls is calculated to determine the number of resources currently within the resource pool. The number of resources within the resource pool is then provided by the probes to Agent 140.

JMX and PMI are provided by certain types of application server frameworks. JMX is a set of specifications for application and network management in the J2EE development and application environment. JMX defines a method for Java developers to integrate their applications with existing network management software by dynamically assigning Java objects with management attributes and operations. JMX is a JAVA standard provided by Sun Microsystems, of Mountain View, Calif. A JMX application server system may be configured to report system resource pool data to Agent 140.

PMI is the underlying application server framework in IBM's "WebSphere" Application Server. In particular, PMI gathers performance data from various run time resources (such as JVM and Thread Pools) and application components (such as servlets and Enterprise Java Beans, or EJBs). PMI is provided by IBM Company, of Armonk, N.Y. PMI application server frameworks can be configured to report information on any resource of which the application server is aware to Agent 140.

After the available resource count is retrieved at step 710, Agent 140 retrieves the maximum resource count from the resource pool at step 720. This is usually performed by the same infrastructure used to retrieve the available resource count at step 710. In one embodiment, the maximum resource count may be reported several times during the life of a resource pool. In other embodiments, the maximum resource count is determined only once during the life of a resource pool (for example, at resource pool initialization).

A determination is made as to whether a transmission event is detected at step 730. The transmission event may trigger Agent 140 to transmit resource pool data to enterprise manager 220. In one embodiment, a transmission event may occur periodically. For example, a transmission event may occur every 15 seconds. In another embodiment, transmission events may occur in response to a request for data, a determination that a memory block is full, detecting a change in the number of resources, some other event. If a transmission event is detected at step 730, operation continues at step 740. If a transmission event is not detected at step 730, operation of method 700 returns to step 710.

Agent 140 transmits the resource pool data, consisting of the available resource count and optionally the maximum resource count, to enterprise manager 220 at step 740. In one embodiment, the counts are transmitted within a resource data message. The resource data message may include agent identification information, JAVA virtual machine (JVM) identification information, resource pool identification information, the maximum number of threads within the resource pool, the available number of threads in the resource pool, and/or other data. Identification information for an agent may indicate which agent is sending the information. JVM identification information may identify the particular virtual machine from which the application server is running on and data is retrieved. The resource pool identification information may identify the particular resource pool within the application server from which the data is taken. In some embodiments, one resource data message may include data for one or more resource pools within an application server. After the resource count information is transmitted at step 740, operation returns to step 710.

Figure 8:
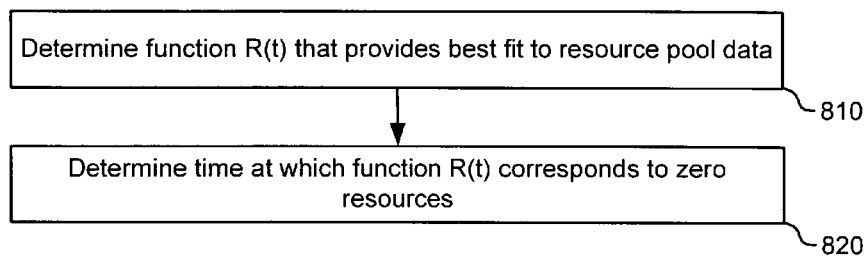
FIG. 8 illustrates an embodiment of a method for determining the time until depletion for a resource pool.

Once the resource pool data is transmitted to Enterprise Manger 220, the depletion information (or resource pool information) for the resource pool is determined. FIG. 8 illustrates an embodiment of a method 800 for determining a time associated with the depletion of a resource pool. In one embodiment, method 800 provides more information for step 620 of method 600 discussed above. First, a function R(t) is generated that provides a best fit to the resource pool data at step 810. Function R(t) may be any function, including a linear function, non-linear function, polynomial function, or other type of function. A linear function fit to data using linear regression will be discussed herein for purposes of discussion.

In one embodiment, multiple functions may be generated at step 810. The generated functions may be the same or different types of functions. For example, multiple linear functions R(t) can be generated, each for a different set of the retrieved resource pool data. Each set of data may contain a different number of data points. In some cases, the different sets of data include the most recent data point and span back a different number of data points. Step 810 is discussed in more detail below in method 900.

After the best fit function is selected in step 810, a time at which the best fit function corresponds to zero resources (a depleted resource pool) is determined at step 820. In one embodiment, values for the function are generated for future time values to determine the depletion point. This is illustrated graphically in FIGS. 10A and 11 and discussed in more detail below.

Figure 9:
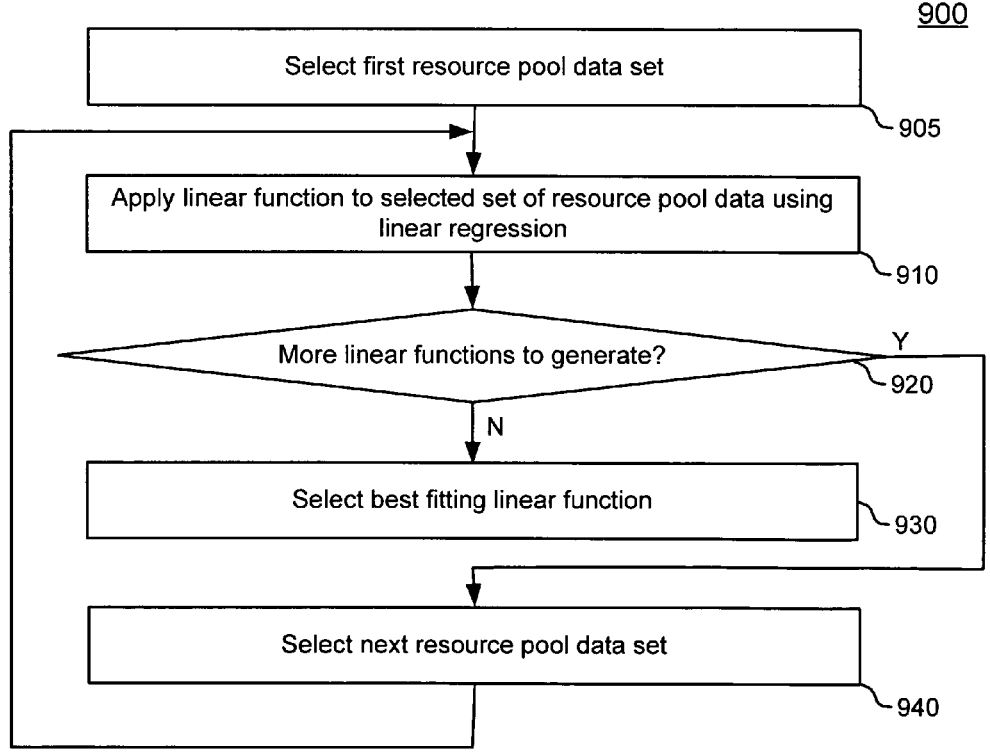
FIG. 9 illustrates an embodiment of a method for determining a best fit function for resource depletion data.

FIG. 9 illustrates an embodiment of a method 900 for determining a function that best fits a set of resource pool data. In one embodiment, method 900 of FIG. 9 provides more detail for step 810 of method 800 discussed above. In one embodiment, the best fit function is determined by generating several linear functions fit to one or more sets of data using linear regression. The best fitting linear function is then selected to determine the depletion time for the resource pool.

Figure 10A:
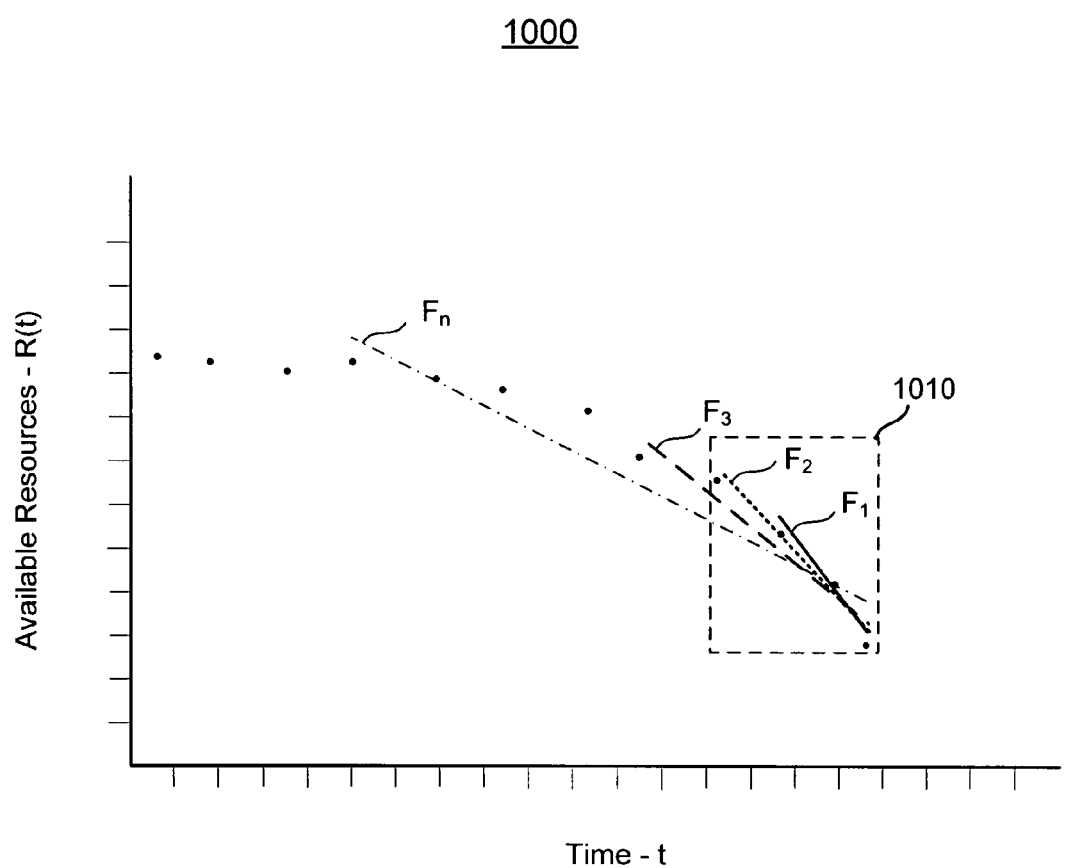
FIG. 10A illustrates an example of a graph of resource depletion data and functions, fit to the resource depletion data.

FIG. 10A illustrates an example of a graph 1000 having functions fit to the resource pool data for a particular resource. Graph 1000 includes four functions, functions $F_1$ through $F_N$, fit to different sets of data points. Graph 1000 will be referenced throughout the discussion of method 900 of FIG. 9.

First in method 900, a first set of resource pool data is selected at step 905. A resource pool data set can be chosen in several ways. In one embodiment, all the data currently available for a resource pool may be chosen. This may be useful when only one function is fitted to the data set. In some embodiments, assuming N functions will be generated for the resource pool data, the first data set may include 1/Nth of the most recent number of data points. The second data set may include 2/Nths of the data points, and so on. In some embodiments, the first data set may contain some threshold number of the data points, such as half the total data points. The next set may contain one additional data point, the next set another data point, etc. In graph 1000, a first function $F_1$, is fit to the three most recent data points of the resource pool data.

After the first data set is selected, a first linear function is applied to the resource pool data set at step 910. In one embodiment, the function is fit (or applied) to the resource pool data using linear regression. With respect to FIG. 10A, the first linear function is illustrated as function $F_1$. Function $F_1$ is fit to the most recent three data points. Though the linear regression can be illustrated graphically for purposes of discussion, a system implementing the linear regression does not actually plot the data. The data points and the linear regression processing is performed in memory.

After the first linear function is applied to the resource pool data, a determination is made as to whether more linear functions should be generated (and applied to resource pool data using linear regression) at step 920. If more linear functions should be generated at step 920, operation continues to step 940. Otherwise, operation continues to step 930.

At step 940, the next set of resource pool data is selected. The next set of resource pool data may be selected as discussed above with respect to step 905. Next, a linear function is applied to the new set of resource pool data using linear regression at step 910. This process continues for a number of iterations. The number of linear regressions may be selected based on the processing and resources available, memory, or other system resources.

For each linear regression, the number of data points within each linear regression may vary. For example, as additional linear regressions are generated, the set of data points may be incremented uniformly. Thus, for a first linear regression, three data points may be used. For the next linear regression, four data points may be used. The next may include 5, the next after that may include 6, and so on. In some embodiments, the number of data points available may be divided by the number of linear regressions to make. For example, if there are 15 data points and 5 linear regressions to generate, the number of data points used for each linear regression may differ by 3 (15 divided by 5). Thus, the first linear regression will include three data points, the second linear regression will be derived from 6 data points, and so on.

In graph 1000 of FIG. 10A, the second function $F_2$ is set to the most recent four data points. The third function $F_3$ is fit against the most recent five data points. The last function $F_N$ is fit against the most recent nine data points. Each of the functions is fit to a different set of data.

After generating one or more linear functions fit to resource pool data using linear regression, the best fitting linear function is selected at step 930. Selecting from more than one linear regression allows functions having different lengths and fits to be considered. This is advantageous because a particular function may fit the overall pattern of the data and/or the recent trend of the most recent data better than another generated function.

The best fitting function may be determined in several ways. In some cases, the data from the linear regressions is normalized before the best fit is selected. One method for determining the best fit of several functions to resource pool data utilizes the following equation:

$$\frac{1+r^2}{1+MSE}.$$

Figure 10B:
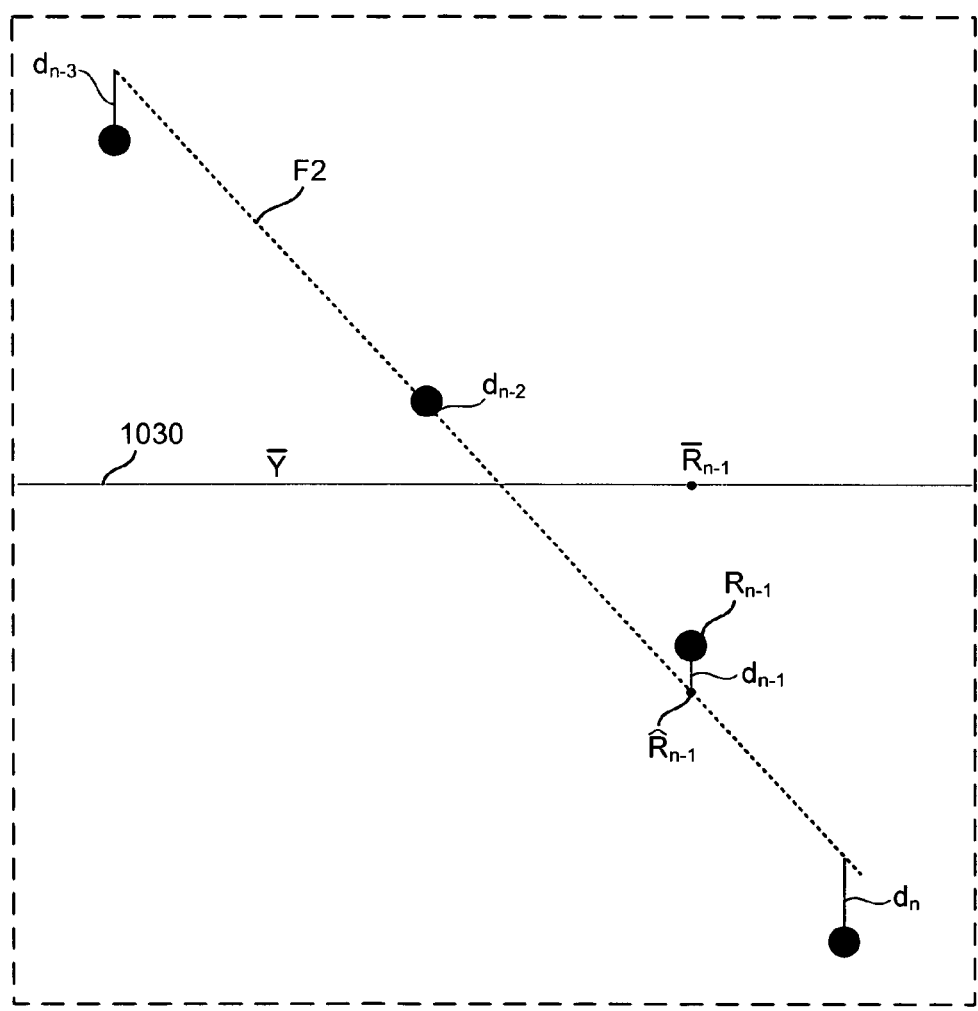
FIG. 10B is an example of a function fit to resource depletion data.

A value for the best fit equation is calculated for each of N functions (and corresponding data sets) fit to the resource pool data. Values for the equation above will range from zero to one. The function corresponding to the value closest to one is the best fitting function. In the above best fit equation, the mean square error MSE may be determined as:

$$MSE = \sum_{i=1}^{n}\left(\frac{\Delta d^2}{n}\right),$$

wherein n is the number of data points in the set and d is the distance between the function and the data point itself. A graphical representation of values for d is illustrated in FIG. 10B, and discussed in more detail below. The coefficient of determination, $r^2$, is a measure of how well the slope of the linear function fits a set of data. The coefficient of determination $r^2$ may be expressed as:

$$r^2 = \frac{\sum(\hat{R}-\overline{R})^2}{\sum(R-\overline{R})^2},$$

wherein $\hat{R}$ is the regression value of R(t) along the function fitted to the data points, $\overline{R}$ is the mean value of R(t), and R is actual value of the data point. A graphical representation of the relationship of $\hat{R}$, $\overline{R}$, and R for a particular function is illustrated in FIG. 10B.

FIG. 10B is an example of a function fit to resource pool data. FIG. 10B provides more detail of plot area 1010 of FIG. 10A. A function $F_2$ is fit against four data points. Both the mean squared error and the coefficient of determination can be derived for $F_2$ from data illustrated in FIG. 10B. The mean squared error for the linear regression is taken as the sum of the square of the distances d between the linear function and the actual data points. Thus, the mean squared error of function $F_2$ can be determined as $d_n^2+d_{n-1}^2+d_{n-2}^2+d_{n-3}^2$, all divided by the number of data points (four). The distances $d_n$, $d_{n-1}$, $d_{n-2}$ and $d_{n-3}$ are illustrated as the distances between the generated linear function $F_2$ and the actual data points at the same point in time. The coefficient of determination $r^2$ is derived from $\hat{R}$, $\overline{R}$, and R. The values for the resources used are illustrated for data point 1060, associated with $R_{n-1}$. For the particular data point 1060, the mean squared error value $\overline{R}_{n-1}$ is higher than the actual value for $R_{n-1}$. The linear regression value for $\hat{R}_{n-1}$ is less than the actual value for $R_{n-1}$.

Figure 11:
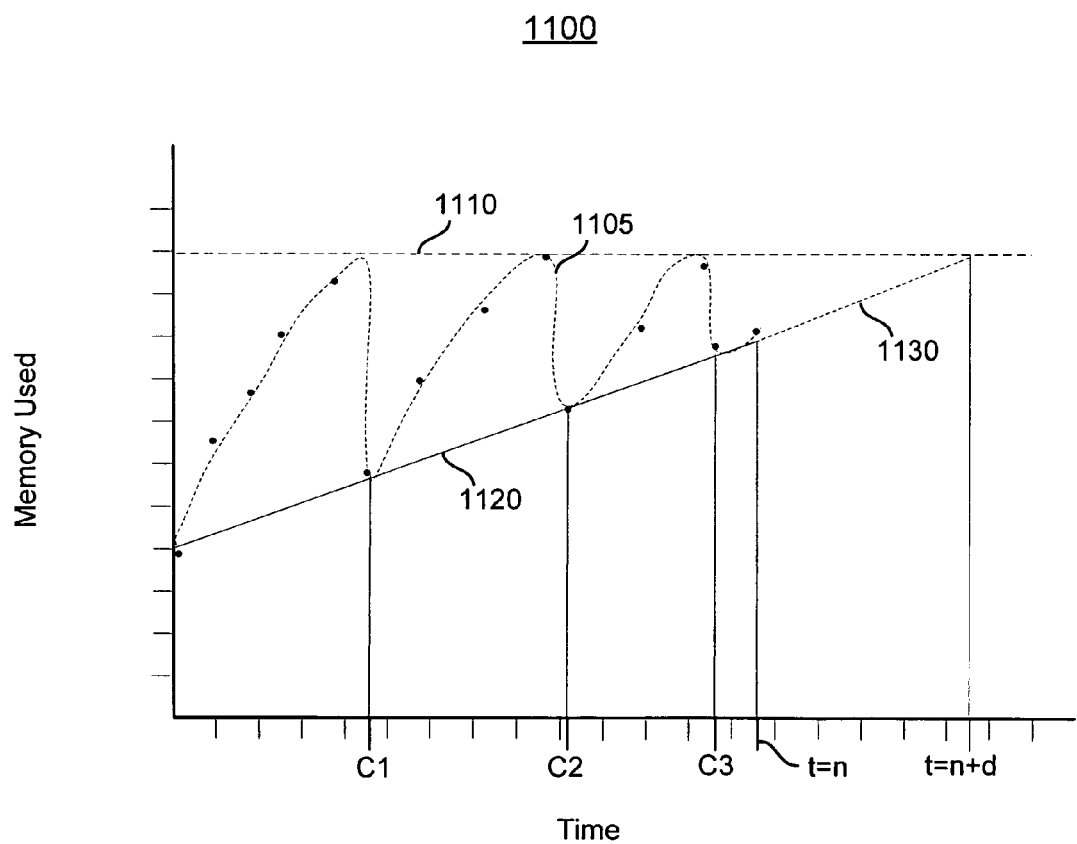
FIG. 11 is an example of a graph of resource depletion data.

Different resource pools can have different resource pool data patterns. For example, a resource pool for memory will have depletion data that differs from a resource pool for threads, such as that illustrated in FIG. 10A. FIG. 11 illustrates an example of a graph 1100 of resource pool data associated with memory of a computing system. Graph 1100 depicts a horizontal axis of times versus a vertical axis of memory used.

The resource pool data plotted in graph 1100 has an approximate path as shown by dotted line 1105. Dotted line 1105 indicates the measured amount of memory being used within an application server over time. The maximum amount of memory resources available is depicted by line 1110. As illustrated, used memory (as shown by dotted line 1105) increases until a maximum memory level 1110 and then experiences a sharp decrease. The used memory level then increases again to maximum memory level line 1110, followed by another steep decrease.

Dotted line 1105 reflects the use of memory in an application server system. Memory is continually used by applications and other server systems. Once applications and other systems are done with portions of code residing in a block of memory (used memory), they indicate to the operating system that the code and/or the memory is no longer needed. Until the operating system performs a garbage collection or determines free memory space in some other manner, the memory space associated with the code will appear to be in use to the operating system (and applications that query the operating system). After the garbage collection, the memory no longer used by the applications will be recognized as available. As a result, the, measured level of used memory will decrease to the actual level of used memory. In graph 1100, the garbage collections are performed at a time associated with points C1, C2, and C3. The actual used memory can be approximated by a line 1120 fit against points C1, C2, and C3.

In the case of a resource pool having memory resources, the depletion information is derived from a limited set of the resource pool data. In particular, the depletion information is derived from data points associated with garbage collections. In one embodiment, the only data to be transmitted to agent 140 for resource pools having memory is the data associated with one or more garbage collections. Data points associated with garbage collections can be obtained in more than one way. In one embodiment, the data points may be determined by sampling the resource pool in response to a garbage collection. In this case, once a garbage collection is performed, the resource pool is sampled very soon afterwards. In some embodiments, the resource pool may be sampled several times, and the data associated with the garbage collections may be determined from the data itself. For example, data points associated with garbage collection may be determined by comparing available memory sampled over time and identifying the data points associated with a decrease in used memory level. Resource pool data associated with garbage collection may also be determined in other ways. Determining resource pool depletion information from resource pool data associated with a memory pool is discussed in more detail with respect to method 1200 of FIG. 12.

A function may then be derived from the garbage collection data. A line 1120 associated with such a function is illustrated in FIG. 11. Values may be generated to extend the function, as shown by dashed line 1130. Eventually, the extended line croses the maximum available memory level line 1110. In FIG. 11, this intersection occurs at a time t=n+d. At this point, the resource pool is depleted and all available memory is estimated to have been used.

Figure 12:
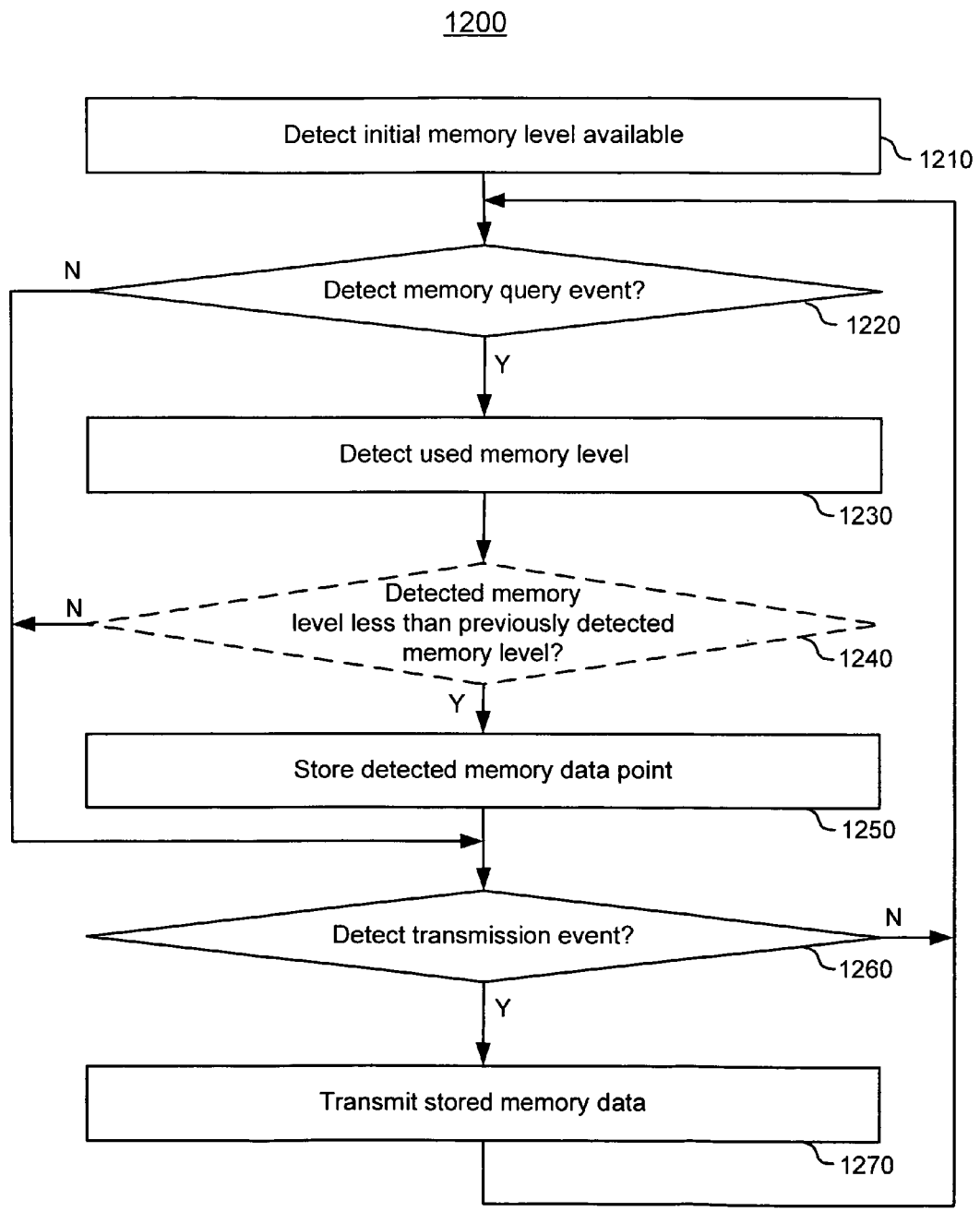
FIG. 12 is an embodiment of a method for retrieving pool resource data.

FIG. 12 illustrates an embodiment of a method 1200 for retrieving resource pool data. In one embodiment, method 1200 is applicable towards a resource pool having memory resources (having resource pool data similar to that plotted in graph 1100). First, the initial memory level available is detected at step 1210. Next, a determination is made as to whether a memory query event is detected at step 1220. The memory query event indicates when the memory level should be sampled. In one embodiment, memory is sampled at the time of a garbage collection. In another embodiment, memory may be sampled at any time. If a memory query event is detected, operation continues to step 1230. If no memory query event is detected, operation continues to step 1260.

The used memory level is detected at step 1230. In one embodiment, the memory level is detected by a query made by agent 140 to the resource pool. In another embodiment, the memory level is detected by probes installed in an application in communication with the resource pool, through PMI or JMX.

In embodiments wherein the resource pool is sampled in response to a garbage collection event, method 1200 continues from step 1230 to step 1250. In this case, it is know that the resource pool data is collected soon after a garbage collection. In some embodiments wherein the used memory level is not sampled in response to a garbage collection event, a determination is made as to whether the memory level is detected to be less than the previously detected memory level at step 1240. Here, the system determines whether the detected used memory level has decreased since the last memory sampling. If the used memory level has been detected to decrease since the last resource pool size sampling, it is likely that a garbage collection has occurred (thus freeing up more memory and the decrease in used memory). Thus, the most recent sampled data is associated with a garbage collection. In one embodiment, the determination includes comparing any decrease to a threshold value. If the detected memory level is less than the previously detected memory level, operation continues at step 1250. If the detected memory level is not less at step 1240, operation continues to step 1260.

The detected memory level is stored at step 1250. Since the detected memory level is determined to be sampled soon after a memory flush has occurred, the memory level data may be useful in determining depletion information for the resource pool. Thus, the data is stored until it is transmitted or otherwise processed.

Next, a determination is made as to whether a transmission event is detected at step 1260. A transmission event may occur in response to a timer, a data request, or some other event. If no transmission event is detected, operation continues to step 1220. If a transmission event is detected at step 1260, the stored memory data is transmitted at step 1270. The stored memory data may be transmitted to Agent 140, Enterprise Manager 220 or some other module. For example, with respect to FIG. 11, the data points associated with collection C1, C2 and C3 would be transmitted. Operation then returns to step 1220.

Once resource pool data is received, the resource pool data is processed to derive resource pool depletion information. As discussed above, the resource pool depletion information may include the time until depletion for one or more resource pools and a confidence level that the resource pool will be depleted. In one embodiment, the resource pool depletion information may be provided to a user and/or administrator in several formats. The formats may include a text message, a graphical interface, and other formats.

FIG. 13 illustrates an embodiment of a method 1300 for providing resource pool depletion information. In one embodiment, method 1300 of FIG. 13 provides more detail for step 630 of method 600 discussed above. A slope and standard deviation data for a resource pool are accessed at step 1320. In one embodiment, the slope and standard deviation may be derived from the resource pool data.

Next, the percent confidence from the slope and standard deviation data are determined at step 1330. In one embodiment, the slope of the data can be taken as the slope of the function which is fit to the data. For example, for a resource pool having thread resources such as that associated with graph 500 of FIG. 5, the slope of the data can be calculated as the slope of line 520. In graph 1100, the slope of data may be calculated as the slope of actual used memory line 1120. The percent confidence is the confidence that a fitted line or function does not have a slope of zero. Thus, this is an indicator of the confidence that the line will cross a level associated with depletion, or that the resource pool appears to be headed towards depletion. In graph 500 of FIG. 5, this is the confidence that line 520 has a tendency to cross R(t)=zero. In graph 1100, this is the confidence that actual used memory line 1120 will cross maximum memory line 1110.

In one embodiment, a T-test may be used to determine the percent confidence that the slope of a line fit to the data is such that the line is heading towards a depletion level. A T-test is a common statistics test used to determine percent confidence. In particular, a T-test may be expressed as a hypothesis test. A hypothesis test may be used to determine if population mean has a certain value or not. In the case of a resource pool having thread or memory resources, the hypothesis test may be used to determine whether a resource pool data set has a mean slope of zero or not. If the mean slope for a selected data set is zero, then the resource pool is not headed towards completion. If the mean slope is not zero, then the resource pool is headed towards depletion. An example of a one sample t test in hypothesis format can be calculated as follows:

$$T = \frac{\sqrt{N}\,(\overline{Y} - \mu_0)}{s},$$

where T is the percent confidence, $\overline{Y}$ is the mean slope of the resource pool data set, s is the standard deviation of the resource pool data set, N is the size of the resource pool data set and $\mu_0$ is the specific value for a mean slope for which the confidence level is determined. As discussed above, use of a T-test is a well known statistical method for determining a confidence level associated with a set of data. Other methods, including other variations of a T-test, exist for determining a percent confidence associated with the slope of a set of data, all of which may be used with the present invention.

Next, a determination is made as to whether the percent confidence is greater than 98% at step 1340. The percent confidence is compared to a threshold value to determine if the resource pool is heading towards depletion. If the resource pool is heading towards completion, further processing should be performed for resource pool data. Having a percent confidence greater than the threshold indicates that the resource pool likely is decreasing towards complete depletion. In one embodiment, the value derived from the T-test example has a value between zero and one (for example 0.989). In this case, the determination at step 1340 includes comparing the T-test result to a desired percentage divided by one hundred (for example, a value of 98% would be expressed as 0.98 in the comparison with the T-test value). In one embodiment, a threshold value other than 98% may be used. If the percent confidence is greater than the indicated threshold, the resource pool is headed towards depletion and operation continues at step 1350. If the percent confidence is not greater than the threshold, then operation returns to step 1320.

If the percent confidence is greater than a selected threshold value at step 1340, depletion time information for the resource pool is determined. The current time is marked, the time until depletion for a resource pool is determined and a depletion time is provided in a resource monitor interface at step 1350. As discussed above, the time until depletion may be determined by calculating values of a function fit to resource pool data for future values of time.

In some embodiments, an initial status for the resource pool is provided at step 1340. The initial resource pool status may be associated with the percent confidence determined at step 1330. Over time, the resource pool status may be updated to reflect a change in the time until depletion as well as other resource pool depletion information.

In some embodiments, a confidence indicator may be provided and updated over time for a resource pool. The confidence indicator may communicate how reliable or likely the depletion information is. For example, a confidence indicator may have settings of "unlikely," "somewhat likely" and "very likely." The different settings may correspond to the amount of time in which resource pool data has indicated the resource pool is headed towards depletion. Thus, resource pool data spanning two minutes and indicating a resource pool is heading towards depletion may have a "somewhat likely" setting. In this case, the confidence setting informs the user that although the resource pool data indicates the resource pool is heading towards depletion, the data has not been analyzed for very long. In another example, resource pool data spanning ninety minutes and indicating a resource pool is heading towards depletion may have a "very likely" setting due to the extended time over which data is collected.

In some embodiments, the confidence indicator may reflect a percentage of time that the resource pool data has indicated that a resource pool is headed towards depletion. For instance, a confidence indicator setting of "unlikely" may be associated with resource pool data which indicates depletion thirty percent or less of the total time associated with the data. For example, for resource pool data that spans nine minutes, only three minutes of the data (thirty percent of nine minutes) indicated that the resource pool was heading towards depletion. Similarly, a setting of "somewhat likely" may be associated with depletion detected between thirty and sixty-five percent of the time, and a setting of "very likely" associated with depletion detected for more than sixty-five percent of the time.

Whether a confidence indicator is associated with the total time or a percentage of time in which the resource pool data indicates depletion, the percent confidence may be continually determined and analyzed as additional data is sampled from the resource pool. Depending on subsequent values of the confidence percentage, the confidence indicator may change over time. In FIG. 13, the slope and standard deviation data for a resource pool are determined at step 1360. Step 1360 is similar to step 1320 discussed above, except that the slope and standard deviation are derived from updated resource pool data. Next, the percent confidence is determined from the slope and standard deviation data at step 1370. Step 1370 is similar to step 1330 discussed above, except that the percent confidence is determined from updated slope and standard deviation values.

A determination is then made as to whether the percent confidence value triggers a change in the resource pool status at step 1380. In one embodiment, a change in resource pool status may include a change in the confidence indicator setting. For instance, the confidence indicator may be changed from a setting of "unlikely" to "somewhat likely" after resource pool data has indicated that the resource pool is headed towards depletion for a requisite period of time. In another embodiment, the resource pool status may indicate whether or not the resource pool is headed towards depletion at all. In this case, the percent confidence may fall below a threshold value for a requisite period of time.

In any case, if the percent confidence value triggers a change in the resource pool status at step 1380, operation continues to step 1390. Otherwise operation continues to step 1395. At step 1390, the resource pool status in a resource monitor interface is adjusted to the level associated with the percent confidence value. Next, optionally, the time until depletion is updated in the resource monitor interface at step 1395. In one embodiment, the time until depletion need not be updated if the time has not changed significantly or need not be changed due to the manner in which it is displayed (for example, when the time is displayed in minutes and has only changed by twenty seconds). Operation then continues to step 1360.

In one embodiment, the depletion information can be provided to a user of an application infrastructure. The application infrastructure may be used to provide a web service over the Internet or some other service. The depletion information can be provided to a user through a resource pool monitor interface. The user may be an administrator for the application infrastructure using the resource pool, an administrator for the resource (for example, an administrator for a database used by the infrastructure), or some other entity.

The depletion information, including the time until depletion, resource pool status, percent confidence, confidence indicator and other information, may be provided in a user interface. The user interface may provide information using text, visual and/or audio indicators, or some other format. In some embodiments, the confidence indicator may indicate whether the resource pool is unlikely, somewhat likely or very likely to be headed towards depletion using graphics and text. The time until depletion may be indicated as a timer counting down until the estimated time of depletion, the actual time at which depletion is expected, or in some other temporal format.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

We claim:

1. A machine-implemented method for monitoring a resource pool, comprising:
   accessing resource pool data;
   fitting a plurality of functions to the resource pool data, each of the functions is fit to data in the resource pool data that covers a different time interval, each of the different time intervals has at least one data point in common;
   determining a measure for each of the functions that defines how well the function fits the resource pool data for the time interval to which the function has been fit;
   selecting one of the plurality of functions as a best overall fit based on the measure for each of the functions; and
   determining resource pool depletion data from the resource pool data and the selected one of the plurality of functions.

2. The machine-implemented method of claim 1, wherein said step of accessing includes:
   accessing the size of a resource pool.

3. The machine-implemented method of claim 1, wherein said step of accessing includes:
   tracking the size of a resource pool over a period of time.

4. The machine-implemented method of claim 1, wherein said step of accessing includes:
   accessing resource pool data using bytecode instrumentation.

5. The method of claim 1, wherein said step of determining resource pool depletion data includes:
   estimating the time at which the resource pool will be depleted.

6. The machine-implemented method of claim 1, wherein said step of fitting a plurality of functions uses linear regression.

7. The machine-implemented method of claim 5, wherein the estimating the time at which the resource pool will be depleted comprises:
   determining the time at which the value of the selected function indicates that the resource pool is depleted.

8. The machine-implemented method of claim 1, further comprising:
   determining a probability that the resource pool is approaching depletion.

9. The machine-implemented method of claim 1, further comprising:
   providing the resource pool depletion data through a user interface.

10. A machine-implemented method of monitoring a resource pool, comprising:
    tracking resource pool data over time for a resource pool;
    fitting a plurality of functions to the resource pool data, each of the functions is fit to data in the resource pool data that covers a different time interval, each of the different time intervals have at least one data point in common;
    determining a measure for each of the functions that defines how well the function fits the resource pool data for the time interval to which the function has been fit;
    selecting one of the plurality of functions as a best overall fit based on the measure for each of the functions;
    estimating a time at which the resource pool will be depleted based on the selected function; and
    determining a probability that the resource pool will become depleted at the estimated time.

11. The machine-implemented method of claim 10, wherein said step of tracking includes:
    storing the size of the resource pool upon occurrence of an event.

12. The machine-implemented method of claim 11, wherein the event is a memory flush.

13. The machine-implemented method of claim 11, wherein the resource pool includes memory, the size of the resource pool includes an amount of available memory.

14. The machine-implemented method of claim 10, wherein said step of tracking includes:
    adding object code to an application; and
    retrieving resource pool data by the object code.

15. The machine-implemented method of claim 10, wherein said step of estimating a time includes:
    approximating the time until the number of resources in the resource pool will be zero.

16. The machine-implemented method of claim 10, wherein the determining a probability that the resource pool will become depleted comprises:

determining the probability that the resource pool will become depleted based on a slope and a standard deviation for the resource pool data during a selected period of time.

17. The machine-implemented method of claim 16, further comprising:
providing an alert to a user in response to determining the probability exceeds a threshold value.

18. One or more processor readable storage devices having processor readable code embodied on said processor readable storage devices, said processor readable code for programming one or more processors to perform a method comprising:
fitting a plurality of functions to resource pool data, each of the functions is fit to data in the resource pool data that covers a different time interval of a plurality of time intervals, each of the plurality of time intervals have at least one data point in common;
determining a measure for each of the functions that defines how well the function fits the resource pool data for the time interval to which the function has been fit;
selecting one of the plurality of functions as a best overall fit based on the measure for each of the functions;
determining an estimated depletion time for the resource pool based on the function that was selected as the best overall fit;
determining a probability that the resource pool will become depleted at the estimated depletion time; and
providing depletion information associated with the resource pool to a user, the depletion information provided in response to said step of determining the probability.

19. The one or more processor readable storage devices of claim 18, wherein the data includes the number of resources available in the resource pool over a period of time.

20. The one or more processor readable storage devices of claim 18, wherein said step of fitting a plurality of functions includes:
fitting a linear function to the data in the resource pool using linear regression for each of the plurality of time intervals.

21. The one or more processor readable storage devices of claim 18, wherein said step of determining a probability that the resource pool will become depleted includes determining the probability that the resource pool will become depleted based on a slope and a standard deviation for the resource pool data during a selected period of time; and wherein the step of providing depletion information includes providing an alert to a user in response to determining the probability.

22. The one or more processor readable storage devices of claim 21, wherein said step of determining a probability that the resource pool will become depleted includes:
determining the probability exceeds a warning threshold.

23. The one or more processor readable storage devices of claim 22, wherein the warning threshold is a probability of at least ninety-percent.

24. The one or more processor readable storage devices of claim 22, further comprising:
determining the probability exceeds the warning threshold for a minimum period of time; and
providing a second alert to a user.

25. An apparatus for processing data, comprising:
a communication interface;
a storage device; and
one or more processors in communication with said storage device and said communication interface, said one or more processors perform a method comprising:
receiving unavailability data that describes the unavailability of a set of resources;
dividing the resource pool data into a plurality of groups having different numbers of data points, each of the groups represents a different time interval, groups associated with more recent time intervals have fewer data points, each group contains at least one data point in common;
applying linear regression to the unavailability data in each of the groups to determine a best fit function for each of the plurality of groups;
selecting one of the best fit functions as a best model for projecting when the set of resources will become unavailable;
approximating a time at which the set of resources will become unavailable based on said selected one of a plurality of best fit functions; and
providing an alert indicating the time at which the set of resources is approximated to become unavailable.

26. The apparatus of claim 25, wherein the unavailability data includes a number of resources available at different points in time.

27. The apparatus of claim 25, wherein said step of approximating includes:
extending the selected best fit function to approximate when the set of resources will become unavailable.

* * * * *

UNITED STATES PATENT AND TRADEMARK OFFICE
CERTIFICATE OF CORRECTION

| | |
|---|---|
| PATENT NO. | : 7,634,590 B2 |
| APPLICATION NO. | : 11/268912 |
| DATED | : December 15, 2009 |
| INVENTOR(S) | : Addleman et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 357 days.

Signed and Sealed this

Ninth Day of November, 2010

David J. Kappos
*Director of the United States Patent and Trademark Office*